(12) United States Patent
Francisco

(10) Patent No.: US 12,170,799 B2
(45) Date of Patent: *Dec. 17, 2024

(54) METHOD AND SYSTEM OF MANAGING AND ALLOCATING COMMUNICATION RELATED RESOURCES

(71) Applicant: Comcast Cable Communications, LLC, Philadelphia, PA (US)

(72) Inventor: Mark D. Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/805,595

(22) Filed: Jun. 6, 2022

(65) Prior Publication Data

US 2022/0303600 A1 Sep. 22, 2022

Related U.S. Application Data

(60) Continuation of application No. 14/600,346, filed on Jan. 20, 2015, now Pat. No. 11,381,857, which is a
(Continued)

(51) Int. Cl.
| | |
|---|---|
| *H04N 21/25* | (2011.01) |
| *H04L 65/612* | (2022.01) |
| *H04L 65/80* | (2022.01) |
| *H04N 7/173* | (2011.01) |
| *H04N 21/643* | (2011.01) |
| *H04N 21/647* | (2011.01) |
| *H04L 65/1101* | (2022.01) |
| *H04L 65/75* | (2022.01) |

(52) U.S. Cl.
CPC ........... *H04N 21/25* (2013.01); *H04L 65/612* (2022.05); *H04L 65/80* (2013.01); *H04N 7/17318* (2013.01); *H04N 21/643* (2013.01); *H04N 21/6473* (2013.01); *H04N 21/64738* (2013.01); *H04L 65/1101* (2022.05); *H04L 65/75* (2022.05)

(58) Field of Classification Search
None
See application file for complete search history.

(56) References Cited

U.S. PATENT DOCUMENTS

| | | |
|---|---|---|
| 5,132,966 A | 7/1992 | Hayano et al. |
| 5,287,347 A | 2/1994 | Spanke |

(Continued)

OTHER PUBLICATIONS

Hierarchical QoS routing in delay-bandwidth sensitive networks, King-Shan Lui; Nahrstedt, K.; Shigang chen., Local Computer Networks, 2000. LCN 2000. Proceedings. 25th Annual IEEE Conference on (0742-1303)(0-7695-0912-6) 2000, pp. 579-588.

(Continued)

*Primary Examiner* — Cai Y Chen
(74) *Attorney, Agent, or Firm* — Banner & Witcoff, Ltd.

(57) ABSTRACT

A system and method for managing communication. The system and method applying to but not limited to settop boxes (STBs) and other devices used to interface services. The management including any number of features and processes associated with achieving Quality of Service (QoS) across different domains and according to network limitations associated with the same.

45 Claims, 1 Drawing Sheet

Related U.S. Application Data continuation of application No. 13/765,110, filed on Feb. 12, 2013, now Pat. No. 8,984,587, which is a division of application No. 11/993,345, filed as application No. PCT/US2006/023902 on Jun. 20, 2006, now Pat. No. 8,402,510.

(60) Provisional application No. 60/692,181, filed on Jun. 20, 2005.

(56) References Cited

U.S. PATENT DOCUMENTS

| | | | |
|---|---|---|---|
| 5,757,771 A | | 5/1998 | Li et al. |
| 6,021,497 A | | 2/2000 | Bouthillier et al. |
| 6,247,058 B1 | | 6/2001 | Miller et al. |
| 6,418,169 B1 | | 7/2002 | Datari |
| 6,570,883 B1 | * | 5/2003 | Wong .................. H04L 47/2433 370/395.42 |
| 6,598,231 B1 | | 7/2003 | Basawapatna et al. |
| 6,654,346 B1 | | 11/2003 | Mahalingaiah et al. |
| 6,763,391 B1 | | 7/2004 | Ludtke |
| 6,895,425 B1 | | 5/2005 | Kadyk et al. |
| 7,149,222 B2 | | 12/2006 | Wiryaman et al. |
| 7,164,678 B2 | | 1/2007 | Connor |
| 7,313,627 B1 | | 12/2007 | Noble |
| 7,620,948 B1 | * | 11/2009 | Rowe ........................ G06F 8/65 717/171 |
| 2001/0030570 A1 | * | 10/2001 | Kim ....................... G11C 17/18 327/525 |
| 2001/0033581 A1 | | 10/2001 | Kawarai et al. |
| 2002/0019853 A1 | * | 2/2002 | Vange .................... H04L 67/01 709/207 |
| 2002/0019984 A1 | | 2/2002 | Rakib |
| 2002/0026528 A1 | | 2/2002 | Lo |
| 2002/0071387 A1 | | 6/2002 | Horiguchi et al. |
| 2002/0093910 A1 | | 7/2002 | Yazaki et al. |
| 2004/0073674 A1 | * | 4/2004 | Vergnaud ............. H04L 63/104 709/227 |
| 2004/0133907 A1 | | 7/2004 | Rodriguez et al. |
| 2005/0036546 A1 | | 2/2005 | Rey et al. |
| 2005/0063402 A1 | | 3/2005 | Rosengard et al. |
| 2005/0064846 A1 | * | 3/2005 | Karaoguz ............... H04L 63/18 713/153 |
| 2005/0125357 A1 | | 6/2005 | Saadat et al. |
| 2005/0132153 A1 | | 6/2005 | Yeh |
| 2006/0080352 A1 | | 4/2006 | Boubez et al. |
| 2006/0168336 A1 | | 7/2006 | Koyanagi et al. |
| 2007/0121588 A1 | | 5/2007 | Chen et al. |
| 2008/0244706 A1 | | 10/2008 | Lenoir et al. |
| 2013/0152120 A1 | | 6/2013 | Francisco |

OTHER PUBLICATIONS

Demonstration of a Flexible Bandwidth Optical Transmitter/Receiver System Scalable to Terahertz Bandwidths Geisler, D.J.; Fontaine, N.K.; Scott, R.P.; Yoo, S.J.B., Photonics Journal, IEEE (1942-0655) 2011, vol. 3, Issue 6; pp. 1013-1022.

Channel Trees: Reducing Latency by Sharing Time Slots in Time-Multiplexed Networks on Chip, Hansson, A.; Coenen, M.; Goossens, K., Hardware/Software Codesign and System Synthesis (CODES+ISSS), 2007 5th IEEE/ACM/FIP International Conference on (978-1-5959-3824-4); 2007, pp. 149-154.

International Search Report and Written Opinion for corresponding Application No. PCT/US06/23902, mailed Jan. 24, 2007, 6 pages.

Extended European Search Report—EP06773583—Mailing Date: May 16, 2014.

Li, V.O.K., et al., "Distributed multimedia systems", Proceedings of the IEEE; vol. 85, Issue 7, DOI: 10.1109/5.611116 Publication Year: 1997, pp. 1063-1108.

Cox, R.V., "On the applications of multimedia processing to communications", Proceedings of the IEEE; vol. 86, Issue: 5 DOI: 10.1109/5.664272; Publication Year: 1998, pp. 755-824.

European Office Action—EP 06773583.7—Mailing Date: Feb. 3, 2017.

Jul. 5, 2017—Canadian Office Action—CA 2,612,897.

May 30, 2018—European Office Action—EP06773583.7.

Jun. 15, 2018—Canadian Office Action—CA 2,612,897.

Jul. 22, 2019—Canadian Office Action—CA 2,612,897.

Biaz, Saad, Techniques for Dynamic and Prioritized Bandwidth Allocation On Incoming Links, Computer Science and Software Engineering Department Auburn University (Year: 2002).

Guerin, R, and V Peris. "Quality-of-Service in Packet Networks: Basic Mechanisms and Direction." Computer networks (Amsterdam, Netherlands: 1999) 31.3 (1999): 169-189. (Year: 1999).

* cited by examiner

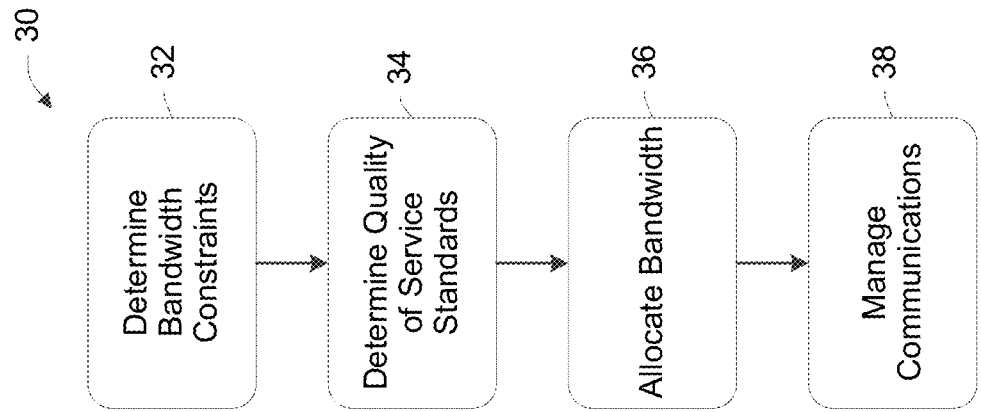
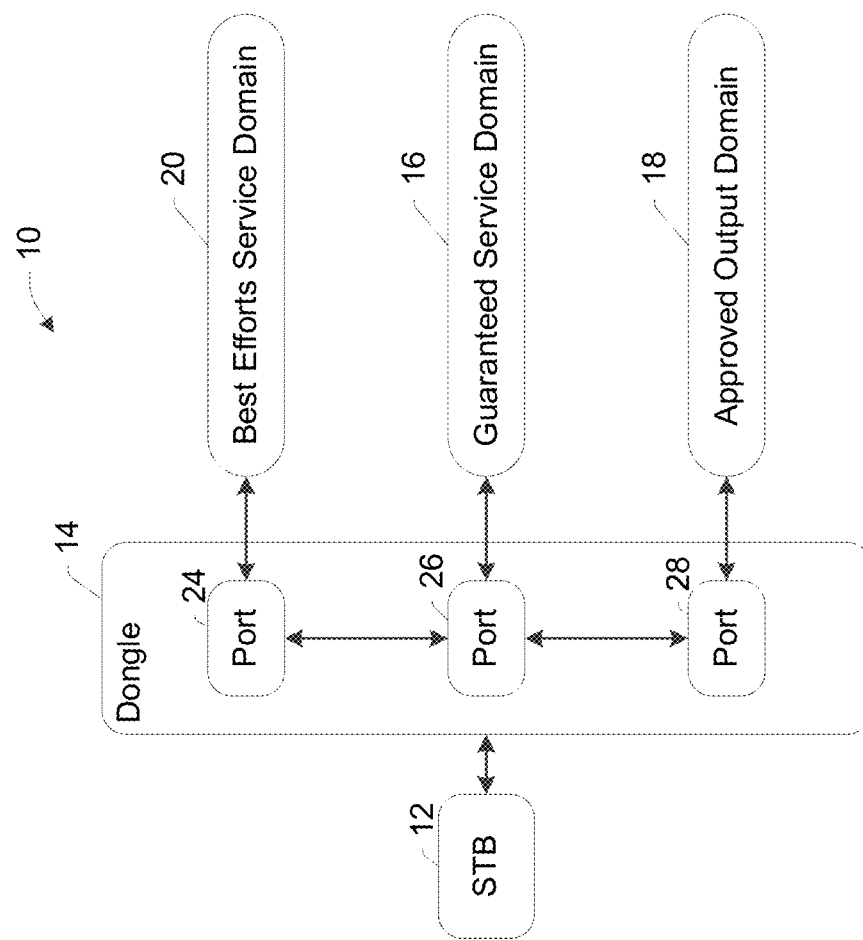

METHOD AND SYSTEM OF MANAGING AND ALLOCATING COMMUNICATION RELATED RESOURCES

CROSS-REFERENCE TO RELATED APPLICATIONS

This application is a continuation of U.S. application Ser. No. 14/600,346, filed Jan. 20, 2015, which is a continuation of U.S. patent application Ser. No. 13/765,110, filed Feb. 12, 2013, now U.S. Pat. No. 8,984,587, which is a divisional of U.S. patent application Ser. No. 11/993,345, filed Nov. 17, 2009, now U.S. Pat. No. 8,402,510, which is a national stage entry of PCT/US06/23902, filed Jun. 20, 2006, which claims the benefit of U.S. Provisional Application No. 60/692,181, filed Jun. 20, 2005. The contents of the above identified applications are incorporated by reference herein in their entirety.

BACKGROUND OF THE INVENTION

1. Field of the Invention

The present invention relates to methods and systems associated with managing settop box (STB) communications.

2. Background Art

Media content providers, such as but not limited to television service providers, typically include a settop box (STB) or other customer premises equipment (CPE) to support interfacing customer site devices with devices of the service provider. These customer devices may include memories, processors, and other capabilities to support descrambling television signals or otherwise supporting services offered by the same, such as high speed data services. Communications supported by the devices are dependent on bandwidth capabilities and the ability of the devices to process particular volumes of data through a limited number of ports.

SUMMARY OF THE INVENTION

One non-limiting aspect of the present invention relates to managing communications of and/or between customer premises devices as a function of available bandwidth.

One non-limiting aspect of the present invention relates to managing communications of and/or between STBs as a function of available bandwidth.

One non-limiting aspect of the present invention relates to managing communications as a function of network prioritization.

One non-limiting aspect of the present invention relates to a method of managing settop box (STB) communications. The method may include differentiating communications between the STB and secured and unsecured networks in communication therewith, and permitting the STB to freely communicate with the secured network and requiring the STB to securely communicate across the unsecured network such that signals are communicated differently according to whether the signals are associated with secured or unsecured networks.

One non-limiting aspect of the present invention relates to a method of managing communications between a settop box (STB) and an authorized service domain, a best efforts domain, and an approved output domain. The method may include prioritizing available bandwidth to support content delivery over the authorized service domain prior to requests for the same so as to guarantee content delivery over the authorized-service domain, and allocating available bandwidth to support content delivery over the best efforts and approved output domain as requests for the same are determined such that content delivery over the best efforts and approved output domains occurs only over bandwidth not prioritized to support the authorized service domain.

One non-limiting aspect of the present invention relates to a method of enabling a STB otherwise unable to support packet switch management to support the same. The method may include attaching a secondary packet switch manager to the STB, the packet switch processor configured to time-delay packet deliveries to the STB as a function of bandwidth constraints on the STB such that the secondary packet switch processor delays data communications to the STB so as to confirm to the bandwidth constraints.

One non-limiting aspect of the present invention relates to a multiple port packet management device. The device may be configured for connecting to a STB, routing information between the ports as a function of prioritization values associated therewith, and formatting the information according to protocols of the STB such that the STB is able to process the managed packets.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a managed networking system in accordance with one non-limiting aspect of the present invention; and FIG. 2 illustrates a flowchart of a method of managing STB communications in accordance with one non-limiting aspect of the present invention.

DETAILED DESCRIPTION OF THE PREFERRED EMBODIMENT(S)

FIG. 1 illustrates a managed networking system 10 in accordance with one non-limiting aspect of the present invention. The system may include a settop box (STB) 12, a dongle 14, a guaranteed service domain 16, an approved output domain 18, a best efforts domain 20, and a number of ports 24-28. Each of the domains may be part of a subscriber home network or associated with some other internal or external network of the STB. The dongle may be configured to manage communications between the STB and the different domains.

The present invention is able to manage and allocate communications associated with the STB and the different domains in communication therewith. The dongle may be configured to control STB activities and interactions with the various domains in accordance with the parameters of the present invention. The dongle may include memories, processors, interfaces, ports, and other capabilities necessary to execute the desired management operations. The dongle may include any number of instructions sets and configurations to facilitate communications with any number of or type of STB, regardless of the STB's vendor.

The dongle may be any type of content adapter or other adapter having any number of ports or other elements to facilitate interfacing signals between the domains and the STB. The dongle may be attached to the STB, embedded, or otherwise integrated within the operation of the same. The dongle may be an after market attachment to the STB and/or otherwise included within the same at the time of manufacturing.

The STB may be a common STB provided by a wireline or wireless television service provider, but the present invention is not so limited and fully contemplates the STB being or associated with any other element used to interface services. The media provider, for exemplary purposes, is most prominently described with respect to being a cable television service provider having capabilities for providing cable television, telecommunications, and high-speed data services to the subscriber locations, primarily through wireline and/or wireline communications.

The present invention, however, is not so limited and fully contemplates the provider being associated with any type of service provider, including other television providers (IP, broadcast, satellite, etc.) and non-television providers, such as those associated with high-speed data, telecommunications, cellular communications, and the like.

The media provider may be configured to support and/or facilitate the use of any number of television and non-television services and applications, such as, but not limited to, linear and non-linear television programming/signaling (cable, satellite, broadcast, etc.), Video on Demand (VOD), interactive television (iTV), interactive gaming, pay-per-view (PPV), digital video recording (local and remote), and others.

The STB may include any number of features and capabilities to support any number of provider and non-provider related services, including capabilities to facilitate descrambling scrambled television signals and outputting the descrambled signals to a television or other output device for viewing or other processing. The STB may also include other capabilities for supporting other services offered by a service provider, including but not limited to data processing capabilities associated with networking and other data related operations.

The domains may each include or be associated with any number of networks, both local to and remote from the STB. The networks may include any number of features and devices to facilitate signal transportation and other operations associated with interfacing the STB with other network related elements and devices or otherwise supporting communications associated with services of the media provider. The networks may include terrestrial and extraterrestrial components and infrastructures, including cable lines, telephone lines, and/or satellite or other wireless architectures. The networks may be associated with other private and/or public networks, such as the Internet and dedicated or virtual private networks.

The networks may include one or more of network support features, such as a headend, router, hub, switch, gateway, conditional access router (CARs), cable modem terminations system (CMTSs), network provisioning unit (NPUs), session boarder controller, media gateway, media gateway controller, signaling gateway, call management server, presence server, SIP routing proxy, SIP proxy/registrar server, PCMM policy server, bandwidth on demand server, streaming server caching proxy, gaming server, VOD server, CDN, media acquisition server, provider server, a unified messaging server, OSS/BSS, global directory server, digital or personal video recorder (DVRs, PVRs), media terminal adapter (MTA), and/or outlet digital adapter (ODA).

The domains may be used to communicate signals between the STB and any number of other devices, such as but not limited to another STB, digital video recorder (DVR), personal computer (PC), display, monitor, television (which may include embedded user interface and processing capabilities), outlet digital adapter (ODA), media terminal adapter (MT A), cable modem (CM), personal digital assistant (PDA), computer, mobile device (phone, computer, etc.), personal media device/playing, and any other item having capabilities to supporting access to any number of the services.

The media devices may be themselves configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, movie pictures expert groups (MPEGx), joint picture experts group (JPEGx), VC1, and others.

The media content supported by the media devices may relate to live, on-demand, or other viewing, streaming, and/or broadcasting of signals associated with supporting television programming, movies, audio, and other multimedia, as well as, downloading of clips or full-length versions of the same, all of which for exemplary purposes may be generally referred to as programs. The content may also be associated with personal content or personally owned content of a subscriber associated with the STB or other entities in communication therewith by way of one of the domains or networks associated with the domains. This content may include non-service provider content and/or service provider content, such as but not limited to music files, digital pictures, personal data files, etc.

The content sources may be the media provider (which in turn may receive the content from other sources) and/or one or more of the subscriber devices or other non-subscriber devices connected to the networks. For example, if the media provider is a television service provider, a portion of the media content may relate to television programs, movies, and other multimedia packets. This content may be delivered from the media service provider to the subscribers through streaming, downloading, broadcast, peer-to-peer, and any number of other processes.

The media content may be delivered to the subscriber locations directly from the media service provider and/or from one or more of the other devices in communication therewith through one of the domains. In more detail, as is common with larger media content providers, multiple regional enterprises, such as headend units and the like, may be configured to provide regional programming to a number of subscribers associated therewith. Each of the headends may store various types of media content for distribution to the subscribers it services. Optionally, the headends may be configured to support headend to headend communications such that non-direct subscribers, i.e., those supported by other headends, may similarly receive content from other headends.

In addition, some of the media content may be sourced from other subscribers, such as by transporting content stored locally on the home networks of the subscriber to other locations within the same home network and/or to other locations beyond the home network that are otherwise in communication therewith through one of the domains. The media provider may include features and capabilities to facilitate such inter-subscriber communications. Furthermore, the media content provider may include software, applications, and other logic to facilitate the distribution and playback of the media content between any of the features, devices, and elements within the system.

The guaranteed service domain may be made up of devices that can establish and maintain guaranteed Quality of Service (QoS) within a home network associated with the STB. Real-time communications or other applications which rely on minimal jitter or delay are well suited for this domain. For devices to reside in the guaranteed service domain, the home network links between the dongle and guaranteed service domain device will need to support QoS. For example, the dongle may include a CableHome gateway with an embedded Media Terminal Adaptor (eMTA) to establish a QoS session to reserve bandwidth across the in-home backbone during a voice call. Content may exit the guaranteed service domain through the best efforts domain, optionally without any QoS guarantees or priority.

Part of the guaranteed service domain may relate to an authorized service domain. The authorized service domain may be made up of devices that are fully within control and protection of the service provider. These devices may be considered to be a part of the cable plant for purposes of content storage and distribution. These devices can receive copy-never content. The requirements of the authorized service domain focuses on enabling the service provider to securely deliver content services to customer premise equipment that is within the authorized service domain.

Content can flow into the authorized service domain from any domain, but content may be limited to exiting the authorized service domain through a device connect to the authorized output domain. A PMP—or even a PC—could be included as part of the authorized service domain if the device maintains and enforces the content security and business rules for that content. Enhanced Conditional Access (ECA) extends the authorized service domain across the home network and to personal media player (PMPs). ECA may include a hardware component and more than simply a software digital rights management (DRM) mechanism.

The approved output domain may define specific digital interfaces to MSO-managed devices which can pass protected content outside of the authorized service domain. These interfaces pass encrypted data and respect any copy protection associated with the content. Devices in the approved output domain may honor the encoding rules or other usage rights associated with the content, e.g. copy-never content cannot be delivered to a storage device through the approved output domain, whereas a storage device in the approved output domain can receive copy-never content.

The best efforts domain may includes device and network segments not conforming to the requirements of the three domains defined above. Devices in this domain may still be discovered and participate in services that do not require content protection or guaranteed quality of service (QoS). A PC browsing the Internet exists in the Best Effort Domain. The guaranteed service domain and authorized service domain may be bridged to the best efforts domain of the PC and its unfettered Internet access. The domains may share Internet Protocol as a common language, but there may be a clear demarcation between the two that governs what and how media flows between them. These domains may be logical distinctions and do not denote particular physical devices. Thus content may flow from the PC or from the Internet into devices that are also part of the authorized service domain—but only as part of a secure and managed application environment.

The dongle may act as an arbitrator between the STB and domains in communication therewith. More specifically, the dongle may manage packet communications between the STB and the domains so as to control the packets processed by the STB. In this manner, the dongle is able to work within the bounds of the limited processing capabilities of the STB so as to provide packet management sufficient to support the various domains and services associated therewith. The dongle may included logic, logic may be downloaded thereto, or logic may be otherwise correlated with the same such that the logic may specify parameters associated with managing packet delivery to the STB.

The dongle may also perform other functions with respect to the different domains, elements and devices connected thereto, and any number of other parameters associated with managing STB interaction with the domains and networks associated therewith. The dongle may be configured to analyze authenticity, security, and other parameters associated with the domains and content communicated over the same so as to protect the STB from outside influences and hacking.

One dongle configuration differentiates STB content request between those directed towards a secured or authorized network associated with one of the domains and an unsecured or unauthorized network. The differentiation may include the dongle searching of requested content from authorized networks before permitting searching or other exposure to the unauthorized networks. If content is only available from the unsecured or unauthorized networks, the dongle may thereafter establish some level of security, link security (as opposed to content security), or other security in order to permit communications therewith. Conversely, if the content is from the secured or authorized network, the STB may be allowed to freely communicate according to previously established protocols and key exchanges, i.e., without additional interrogations before commencing communications.

Another dongle configuration may differentiate between content endpoints such that content transferred to particular endpoints are assign rights, such as but not limited to usage rights. This can be helpful, for example, when transmitting content from the STB to the approved output domain so that devices receiving the content can only access the content within the parameters of the usage rights. This applies at least some level of control to content distributed to locations our of the server providers control, unlike the guaranteed and authorized service domains that are controlled by the service provider.

Another dongle configuration allows the dongle to manage the STB as if the STB were a node within a home network or within in some other networking scheme. This may include the dongle metering information travel between the ports according to limitations on the domains and networks associated therewith, in addition to or in place of the metering the information to the STB. As such, information routed through the STB can be selectively distributed to the networks associated with each of the various domains as a function of limitations of the networks. For example, if one port is associated with a high-speed network and another port is associated with a lower speed network, the dongle may be configured to meter information travel between the two ports to that the port having the lower speed network (or endpoint) is not overburdened. Optionally, this may include assessing bandwidth constraints on the ports and limiting information transmission so as to prevent television viewing or access to other core services occurring over the same port.

FIG. 2 illustrates a flowchart 30 of a method of managing STB communications in accordance with one non-limiting aspect of the present invention. The method generally relates to controlling packet processing with the dongle so as to limit processing demands on the STB. The present invention, however, is not so limited and fully contemplates the dongle or operations associated therewith being performed by the STB or other entity associated therewith.

Block 32 relates to determining bandwidth constraints on the STB. The bandwidth constraints are generally associated with processing limitations of the STB and the need of the STB to guarantee support for particular services associated with the media service provider. One aspect of this determination relates to determining bandwidth constraints with respect to the processing capabilities of the STB.

The bandwidth constraints may be determined as a function of services being accessed through the STB, such as a function of whether the STB is being used to tune to television signals, watch a movie or program through VOD, play games through interactive gaming, access personal content, and other core features associated with the service provider.

The bandwidth constraints may be determined as a function of other influences on the STB, such as a function of controlling the STB to output content from a DVR connected thereto over the approved output domain, receiving content at the STB from sources connected to the best efforts domain, and other operations where immediate access to the content is not critical to service.

The bandwidth constraints may be determined in a real-time manner and continuously as a function of packets being received at the STB by the dongle. In this manner, all requests for packet processing by the STB are analyzed by the dongle and used to determine current bandwidth requirements of the STB necessary to support the services associated therewith.

Block 34 relates to prioritizing the bandwidth demands as a function of the services associated therewith. Optionally, each packet delivered to the dongle may be marked or otherwise tagged with an indicator associated with various QoS categories. The tags may be analyzed by the dongle when determining the above bandwidth constraints and used to categories the bandwidth constraints according to different QoS levels.

For example, packets associated with the guaranteed service domain may be associated with QoS categories having priority over the other domains, as packets associated with the guaranteed service domain mar be given top priority in accordance with core service support requirements of the service provider. Various levels of priority may be associated with each type of packet or the content associated therewith. Based on these QoS, the dongle may prioritize the packets to be processed by the STB.

Block 36 relates to allocating bandwidth of the STB according to the prioritization and bandwidth capabilities of the STB. This may include allowing the STB to process all packets received by the dongle at a particular period of time, if the STB includes sufficient capabilities, and/or metering the packets sent to the STB as a function of the QoS categories associated therewith. Optionally, the prioritization of the QoS categories may vary as a function of services being accessed through the STB such that certain packets may change priority levels relative to other packets depending on the accessed service.

Block 38 relates to continuing management of STB communications by repeating the management process described above. The management may continue in a real-time manner such that packets are constantly being prioritized and delivered to the STB as a function of current bandwidth constraints.

As noted above, one non-limiting aspect of the present invention describes a set of devices that connect together within the home or other environment to share high-quality video content to televisions in the home. A personal content adapter (dongle) may be used to allow personal computers to share the same network. The network containing the personal content adapter enables personal content on user's computers to traverse the network either between computers or between computers and the television without affecting the quality of the television to television video experience.

Optionally, a network can be used to transport content between multiple receivers (STBs, etc). Applications that allow personal content (i.e. photos, music, documents) to traverse the same network as the video receivers may be used to transfer other content. One non-limiting aspect of the present invention relates to assuring the video receiver applications while offering the benefits of personal content connectivity.

The home network personal content adapter (dongle) advantageously may be used to fulfill the needs of media consumers with computers and video devices located within the home. These customers are amassing quantities of personal content such as home videos and family photos on their computers. The ability to readily view these assets on the television is desired and can be offered without with management provided with the content adapter. The adapter maintains a quality experience for traditional television content viewing (both live broadcast and recorded) while adding benefits of personal content connectivity.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A system comprising:
a computing device; and
a receiver device,
wherein the computing device is configured to:
receive a first plurality of packets of first content;
receive a second plurality of packets of second content;
determine, based on available bandwidth associated with the receiver device and based on a type of service associated with the first content, a first priority level for one or more packets of the first plurality of packets;

determine, based on a type of service associated with the second content, a second priority level for one or more packets of the second plurality of packets; and send, to the receiver device and after determining that the first priority level is higher than the second priority level, at least one packet of the first plurality of packets, and wherein the receiver device is configured to:

receive the at least one packet of the first plurality of packets.

2. The system of claim 1, wherein the computing device is further configured to:

determine that an authorized service domain is associated with the first content and a domain other than an authorized service domain is associated with the second content, and wherein the computing device is configured to determine the first priority level and determine the second priority level based, at least in part, on determining that the authorized service domain is associated with the first content and the other domain is associated with the second content.

3. The system of claim 1, wherein the computing device is configured to receive the second plurality of packets of second content by, based on determining that the second content is only available from an unsecured network, establishing link level security for receiving the second content.

4. The system of claim 1, wherein the computing device is configured to determine the first priority level by determining the first priority level based on whether the receiver device requires immediate access to the first content.

5. The system of claim 1, wherein the computing device is further configured to:

determine a type of a quality of service (QOS) domain associated with the first plurality of packets, and wherein the computing device is configured to determine the first priority level by determining, based at least in part on the type of the QoS domain, the first priority level.

6. The system of claim 1, wherein the computing device is further configured to:

bridge an authorized services domain to an approved output domain, wherein the first plurality of packets are received via the authorized services domain, and wherein the computing device is configured to send the at least one packet to the receiver device by sending the at least one packet of the first plurality of packets to the receiver device via the approved output domain.

7. The system of claim 1, wherein the computing device is configured to send the at least one packet of the first plurality of packets by sending, in an order based on the first priority level being higher than the second priority level, at least one packet of the first plurality of packets ahead of at least one packet of the second plurality of packets.

8. The system of claim 1, wherein the computing device is configured to receive the first plurality of packets of first content by receiving the first plurality of packets of first content via one or more private networks associated with a content service provider.

9. The system of claim 1, wherein the computing device is configured to receive the second plurality of packets of second content by receiving the second plurality of packets of second content via one or more publicly accessible networks.

10. The system of claim 1, wherein the computing device is further configured to:

time delay, based on available bandwidth, delivery of at least one packet of the first plurality of packets or of the second plurality of packets.

11. The system of claim 1, wherein a proxy server is configured to service the receiver device.

12. One or more non-transitory computer readable media storing instructions that, when executed, cause:

receiving a first plurality of packets of first content;

receiving a second plurality of packets of second content;

determining, based on available bandwidth associated with a receiver device and based on a type of service associated with the first content, a first priority level for one or more packets of the first plurality of packets;

determining, based on a type of service associated with the second content, a second priority level for one or more packets of the second plurality of packets; and sending, to the receiver device and after determining that the first priority level is higher than the second priority level, at least one packet of the first plurality of packets.

13. The one or more non-transitory computer readable media of claim 12, wherein the instructions, when executed further cause:

determining that an authorized service domain is associated with the first content and a domain other than an authorized service domain is associated with the second content, and wherein determining the first priority level and determining the second priority level are based, at least in part, on determining that the authorized service domain is associated with the first content and the other domain is associated with the second content.

14. The one or more non-transitory computer readable media of claim 12, wherein the instructions, when executed cause:

receiving the second plurality of packets of second content by, based on determining that the second content is only available from an unsecured network, establishing link level security for receiving the second content.

15. The one or more non-transitory computer readable media of claim 12, wherein the instructions, when executed cause:

determining the first priority level by determining the first priority level based on whether the receiver device requires immediate access to the first content.

16. The one or more non-transitory computer readable media of claim 12, wherein the instructions, when executed further cause:

determining a type of a quality of service (QOS) domain associated with the first plurality of packets, and wherein the instructions, when executed cause determining the first priority level by determining, based at least in part on the type of the QoS domain, the first priority level.

17. The one or more non-transitory computer readable media of claim 12, wherein the instructions, when executed further cause:

bridging an authorized services domain to an approved output domain, wherein the first plurality of packets are received via the authorized services domain, and wherein sending the at least one packet to the receiver device comprises sending the at least one packet of the first plurality of packets to the receiver device via the approved output domain.

18. The one or more non-transitory computer readable media of claim 12, wherein the instructions, when executed cause:
sending the at least one packet of the first plurality of packets by sending, in an order based on the first priority level being higher than the second priority level, at least one packet of the first plurality of packets ahead of at least one packet of the second plurality of packets.

19. The one or more non-transitory computer readable media of claim 12, wherein the instructions, when executed cause:
receiving the first plurality of packets of first content by receiving the first plurality of packets of first content via one or more private networks associated with a content service provider.

20. The one or more non-transitory computer readable media of claim 12, wherein the instructions, when executed cause:
receiving the second plurality of packets of second content by receiving the second plurality of packets of second content via one or more publicly accessible networks.

21. The one or more non-transitory computer readable media of claim 12, wherein the instructions, when executed further cause:
time delaying, based on available bandwidth, delivery of at least one packet of the first plurality of packets or of the second plurality of packets.

22. The one or more non-transitory computer readable media of claim 12, wherein a proxy server is configured to service the receiver device.

23. An apparatus comprising:
one or more processors; and
memory storing instructions, that when executed by the one or more processors, cause the apparatus to:
receive a first plurality of packets of first content;
receive a second plurality of packets of second content;
determine, based on available bandwidth associated with a receiver device and based on a type of service associated with the first content, a first priority level for one or more packets of the first plurality of packets;
determine, based on a type of service associated with the second content, a second priority level for one or more packets of the second plurality of packets; and
send, to the receiver device and after determining that the first priority level is higher than the second priority level, at least one packet of the first plurality of packets.

24. The apparatus of claim 23, wherein the instructions, when executed by the one or more processors, further cause the apparatus to:
determine that an authorized service domain is associated with the first content and a domain other than an authorized service domain is associated with the second content, and
wherein the instructions, when executed by the one or more processors, cause determining the first priority level and determining the second priority level based, at least in part, on determining that the authorized service domain is associated with the first content and the other domain is associated with the second content.

25. The apparatus of claim 23, wherein the instructions, when executed by the one or more processors, cause the apparatus to:
receive the second plurality of packets of second content by, based on determining that the second content is only available from an unsecured network, establishing link level security for receiving the second content.

26. The apparatus of claim 23, wherein the instructions, when executed by the one or more processors, cause the apparatus to:
determine the first priority level by determining the first priority level based on whether the receiver device requires immediate access to the first content.

27. The apparatus of claim 23, wherein the instructions, when executed by the one or more processors, further cause the apparatus to:
determine a type of a quality of service (QOS) domain associated with the first plurality of packets, and
wherein the instructions, when executed by the one or more processors, cause the apparatus to determine the first priority level by determining, based at least in part on the type of the QoS domain, the first priority level.

28. The apparatus of claim 23, wherein the instructions, when executed by the one or more processors, further cause the apparatus to:
bridge an authorized services domain to an approved output domain,
wherein the first plurality of packets are received via the authorized services domain, and
wherein the instructions, when executed by the one or more processors, cause the apparatus to send the at least one packet to the receiver device by sending the at least one packet of the first plurality of packets to the receiver device via the approved output domain.

29. The apparatus of claim 23, wherein the instructions, when executed by the one or more processors, cause the apparatus to:
send the at least one packet of the first plurality of packets by sending, in an order based on the first priority level being higher than the second priority level, at least one packet of the first plurality of packets ahead of at least one packet of the second plurality of packets.

30. The apparatus of claim 23, wherein the instructions, when executed by the one or more processors, cause the apparatus to:
receive the first plurality of packets of first content by receiving the first plurality of packets of first content via one or more private networks associated with a content service provider.

31. The apparatus of claim 23, wherein the instructions, when executed by the one or more processors, cause the apparatus to:
receive the second plurality of packets of second content by receiving the second plurality of packets of second content via one or more publicly accessible networks.

32. The apparatus of claim 23, wherein the instructions, when executed by the one or more processors, further cause the apparatus to:
time delay, based on available bandwidth, delivery of at least one packet of the first plurality of packets or of the second plurality of packets.

33. The apparatus of claim 23, wherein a proxy server is configured to service the receiver device.

34. A system comprising:
a computing device; and
a receiver device, wherein the computing device is configured to:
receive, via a first network, a first plurality of packets of first content;
receive, via a second network, a second plurality of packets of second content;
determine, based on the first network being a secure network and based on a type of service associated with the first content, a first priority level of the first plurality of packets;
determine, based on the second network being an unsecure network and based on a type of service associated with the second content, a second priority level of the second plurality of packets; and
send, to the receiver device and based on determining that the first priority level is higher than the second priority level, at least one packet of the first plurality of packets, and
wherein the receiver device is configured to:
receive the at least one packet of the first plurality of packets.

35. The system of claim 34, wherein the computing device is further configured to:
determine that the type of service associated with the first content is a same type as the type of service associated with the second content.

36. The system of claim 34, wherein the computing device is configured to determine the first priority level by:
determining a type of a quality of service (QOS) domain associated with the first plurality of packets; and
determining, based at least in part on the type of the QoS domain, the first priority level.

37. The system of claim 34, wherein the computing device is configured to send the at least one packet by:
sending, in an order based on the first priority level being higher than the second priority level, at least one packet of the first plurality of packets ahead of at least one packet of the second plurality of packets.

38. One or more non-transitory computer readable media storing instructions that, when executed, cause:
receiving, by a device and via a first network, a first plurality of packets of first content;
receiving, by the device and via a second network, a second plurality of packets of second content;
determining, based on the first network being a secure network and based on a type of service associated with the first content, a first priority level of the first plurality of packets;
determining, based on the second network being an unsecure network and based on a type of service associated with the second content, a second priority level of the second plurality of packets; and
sending, to a receiver device and based on determining that the first priority level is higher than the second priority level, at least one packet of the first plurality of packets.

39. The one or more non-transitory computer readable media of claim 38, wherein the instructions, when executed further cause:
determining that the type of service associated with the first content is a same type as the type of service associated with the second content.

40. The one or more non-transitory computer readable media of claim 38, wherein the instructions, when executed cause:
determining the first priority level by:
determining a type of a quality of service (QOS) domain associated with the first plurality of packets; and
determining, based at least in part on the type of the QoS domain, the first priority level.

41. The one or more non-transitory computer readable media of claim 38, wherein the instructions, when executed cause:
sending the at least one packet by sending, in an order based on the first priority level being higher than the second priority level, at least one packet of the first plurality of packets ahead of at least one packet of the second plurality of packets.

42. An apparatus comprising:
one or more processors; and
memory storing instructions, that when executed by the one or more processors, cause the apparatus to:
receive, via a first network, a first plurality of packets of first content;
receive, via a second network, a second plurality of packets of second content;
determine, based on the first network being a secure network and based on a type of service associated with the first content, a first priority level of the first plurality of packets;
determine, based on the second network being an unsecure network and based on a type of service associated with the second content, a second priority level of the second plurality of packets; and
send, to a receiver device and based on determining that the first priority level is higher than the second priority level, at least one packet of the first plurality of packets.

43. The apparatus of claim 42, wherein the instructions, when executed by the one or more processors, further cause the apparatus to:
determine that the type of service associated with the first content is a same type as the type of service associated with the second content.

44. The apparatus of claim 42, wherein the instructions, when executed by the one or more processors, cause the apparatus to:
determine the first priority level by:
determining a type of a quality of service (QOS) domain associated with the first plurality of packets; and
determining, based at least in part on the type of the QoS domain, the first priority level.

45. The apparatus of claim 42, wherein the instructions, when executed by the one or more processors, cause the apparatus to:
send the at least one packet by sending, in an order based on the first priority level being higher than the second priority level, at least one packet of the first plurality of packets ahead of at least one packet of the second plurality of packets.

* * * * *